(12) United States Patent
Park et al.

(10) Patent No.: US 11,334,067 B2
(45) Date of Patent: May 17, 2022

(54) APPARATUS AND METHOD FOR PROVIDING SAFETY STRATEGY IN VEHICLE

(71) Applicants: Hyundai Motor Company, Seoul (KR); KIA Motors Corporation, Seoul (KR)

(72) Inventors: Sung Min Park, Seoul (KR); Jin Su Jeong, Gyeonggi-do (KR); Jae Yong Jeon, Gyeonggi-do (KR)

(73) Assignees: Hyundai Motor Company, Seoul (KR); KIA Motors Corporation, Seoul (KR)

(*) Notice: Subject to any disclaimer, the term of this patent is extended or adjusted under 35 U.S.C. 154(b) by 156 days.

(21) Appl. No.: 16/372,896

(22) Filed: Apr. 2, 2019

(65) Prior Publication Data

US 2019/0317493 A1    Oct. 17, 2019

Related U.S. Application Data

(60) Provisional application No. 62/655,831, filed on Apr. 11, 2018.

(30) Foreign Application Priority Data

Nov. 15, 2018    (KR) .................... 10-2018-0140867

(51) Int. Cl.
*G05D 1/00* (2006.01)
*B60Q 9/00* (2006.01)
(Continued)

(52) U.S. Cl.
CPC ............. *G05D 1/0061* (2013.01); *B60Q 9/00* (2013.01); *B60W 30/09* (2013.01);
(Continued)

(58) Field of Classification Search
CPC ....... G05D 1/0061; B60Q 9/00; B60W 30/09; B60W 50/0098; B60W 50/14;
(Continued)

(56) References Cited

U.S. PATENT DOCUMENTS 4,361,202 A   11/1982   Minovitch
5,314,037 A    5/1994   Shaw et al.
(Continued)

FOREIGN PATENT DOCUMENTS

DE    198 21 122 A1    6/1999
DE    101 14 187 A1    9/2002
(Continued)

OTHER PUBLICATIONS

European Search Report dated Mar. 27, 2020 from the corresponding European Application No. 19167264.1, 8 pages.
(Continued)

*Primary Examiner* — Marthe Y Marc-Coleman
(74) *Attorney, Agent, or Firm* — Morgan, Lewis & Bockius LLP

(57) ABSTRACT

An apparatus for providing a safety strategy in a vehicle is provided. The apparatus includes a sensor configured to obtain information about a driver of the vehicle, an output device configured to output a notification to the driver, and a control circuit configured to be electrically connected with the sensor and the output device. The control circuit is configured to recognize a state of the driver based on the information obtained by the sensor, set a route toward a safety zone, when the state of the driver meets a specified condition, and control the vehicle to change a lane where the vehicle is traveling to a lane adjacent to the safety zone.

14 Claims, 8 Drawing Sheets

(51) Int. Cl.
*B60W 30/09* (2012.01)
*B60W 50/00* (2006.01)
*B60W 50/14* (2020.01)

(52) U.S. Cl.
CPC ........ *B60W 50/0098* (2013.01); *B60W 50/14* (2013.01); *B60W 2540/22* (2013.01)

(58) Field of Classification Search
CPC ......... B60W 2540/22; B60W 2540/24; B60W 2540/26; B60W 2540/043; B60W 30/18163; B60W 30/18; B60W 30/08; B60W 40/08; B60W 2050/143; B60W 2050/146; B60K 28/06
See application file for complete search history.

(56) References Cited

U.S. PATENT DOCUMENTS

| | | |
|---|---|---|
| 5,521,579 A | 5/1996 | Bernhard |
| 6,055,467 A | 4/2000 | Mehring et al. |
| 6,473,678 B1 | 10/2002 | Satoh et al. |
| 6,842,687 B2 | 1/2005 | Winner et al. |
| 7,363,140 B2 | 4/2008 | Ewerhart et al. |
| 7,821,421 B2 | 10/2010 | Tamir et al. |
| 8,073,595 B2 | 12/2011 | Tabata et al. |
| 8,457,827 B1 | 6/2013 | Ferguson et al. |
| 8,521,352 B1 | 8/2013 | Ferguson et al. |
| 8,798,841 B1 | 8/2014 | Nickolaou et al. |
| 8,874,301 B1 | 10/2014 | Rao et al. |
| 9,079,571 B2 | 7/2015 | Trost et al. |
| 9,315,178 B1 | 4/2016 | Ferguson et al. |
| 9,527,441 B2 | 12/2016 | Matsumura |
| 9,874,871 B1 | 1/2018 | Zhu et al. |
| 10,183,668 B2 | 1/2019 | Takae |
| 10,324,463 B1 | 6/2019 | Konrardy et al. |
| 10,449,856 B2 | 10/2019 | Kojima |
| 10,451,730 B2 | 10/2019 | Talamonti et al. |
| 10,558,213 B2 | 2/2020 | Sato et al. |
| 10,618,523 B1 | 4/2020 | Fields et al. |
| 10,627,813 B2 | 4/2020 | Tsuji et al. |
| 10,663,971 B2 | 5/2020 | Sugawara et al. |
| 10,676,084 B2 | 6/2020 | Fujii |
| 10,814,913 B2 | 10/2020 | Fujii |
| 10,935,974 B1 | 3/2021 | Fields et al. |
| 2003/0163239 A1 | 8/2003 | Winner et al. |
| 2005/0137782 A1 | 6/2005 | Shinada |
| 2005/0228588 A1 | 10/2005 | Braeuchle et al. |
| 2005/0256630 A1 | 11/2005 | Nishira et al. |
| 2006/0009910 A1 | 1/2006 | Ewerhart et al. |
| 2007/0043505 A1 | 2/2007 | Leicht |
| 2007/0255474 A1 | 11/2007 | Hayakawa et al. |
| 2008/0172153 A1 | 7/2008 | Ozaki et al. |
| 2008/0204212 A1 | 8/2008 | Jordan et al. |
| 2009/0005933 A1 | 1/2009 | Tabata et al. |
| 2009/0088925 A1 | 4/2009 | Sugawara et al. |
| 2009/0132125 A1 | 5/2009 | Yonezawa et al. |
| 2009/0171533 A1 | 7/2009 | Kataoka |
| 2009/0194350 A1 | 8/2009 | Rattapon et al. |
| 2009/0299573 A1 | 12/2009 | Thrun et al. |
| 2009/0319113 A1 | 12/2009 | Lee |
| 2010/0010733 A1 | 1/2010 | Krumm |
| 2010/0042282 A1 | 2/2010 | Taguchi et al. |
| 2010/0289632 A1 | 11/2010 | Seder et al. |
| 2011/0169625 A1* | 7/2011 | James .................. G08G 1/166 340/439 |
| 2011/0196592 A1 | 8/2011 | Kashi et al. |
| 2011/0241862 A1* | 10/2011 | Debouk ............. B60W 50/035 340/439 |
| 2011/0251758 A1 | 10/2011 | Kataoka |
| 2011/0293145 A1 | 12/2011 | Nogami et al. |
| 2012/0166032 A1 | 6/2012 | Lee et al. |
| 2012/0296522 A1 | 11/2012 | Otuka |
| 2013/0063595 A1 | 3/2013 | Niem |
| 2013/0066525 A1 | 3/2013 | Tomik et al. |
| 2013/0226406 A1 | 8/2013 | Ueda et al. |
| 2014/0074356 A1 | 3/2014 | Bone |
| 2014/0336896 A1 | 11/2014 | Udaka et al. |
| 2015/0006012 A1 | 1/2015 | Kammel et al. |
| 2015/0006013 A1 | 1/2015 | Wimmer et al. |
| 2015/0019063 A1 | 1/2015 | Lu et al. |
| 2015/0094899 A1 | 4/2015 | Hackenberg et al. |
| 2015/0148985 A1 | 5/2015 | Jo |
| 2015/0166062 A1 | 6/2015 | Johnson et al. |
| 2015/0204687 A1 | 7/2015 | Yoon et al. |
| 2015/0353082 A1 | 12/2015 | Lee et al. |
| 2015/0355641 A1 | 12/2015 | Choi et al. |
| 2015/0360721 A1 | 12/2015 | Matsuno et al. |
| 2016/0001781 A1 | 1/2016 | Fung et al. |
| 2016/0091897 A1 | 3/2016 | Nilsson et al. |
| 2016/0107682 A1 | 4/2016 | Tan et al. |
| 2016/0107687 A1 | 4/2016 | Yamaoka |
| 2016/0187879 A1 | 6/2016 | Mere et al. |
| 2016/0225261 A1 | 8/2016 | Matsumoto |
| 2016/0250968 A1 | 9/2016 | Shirakata et al. |
| 2016/0272204 A1 | 9/2016 | Takahashi et al. |
| 2016/0288707 A1 | 10/2016 | Matsumura |
| 2016/0297431 A1 | 10/2016 | Eigel et al. |
| 2016/0297447 A1 | 10/2016 | Suzuki |
| 2016/0339913 A1 | 11/2016 | Yamashita et al. |
| 2016/0349066 A1 | 12/2016 | Chung et al. |
| 2016/0368492 A1 | 12/2016 | Al-Stouhi |
| 2017/0003683 A1 | 1/2017 | Sato et al. |
| 2017/0061799 A1 | 3/2017 | Fujii et al. |
| 2017/0108865 A1 | 4/2017 | Rohde et al. |
| 2017/0124882 A1 | 5/2017 | Wang |
| 2017/0171375 A1 | 6/2017 | Kamata |
| 2017/0197637 A1 | 7/2017 | Yamada et al. |
| 2017/0203763 A1 | 7/2017 | Yamada et al. |
| 2017/0203764 A1 | 7/2017 | Fujiki et al. |
| 2017/0240172 A1 | 8/2017 | Nishiguchi |
| 2017/0240186 A1 | 8/2017 | Hatano |
| 2017/0243491 A1 | 8/2017 | Fujii et al. |
| 2017/0291603 A1 | 10/2017 | Nakamura |
| 2017/0308094 A1 | 10/2017 | Abe et al. |
| 2017/0313313 A1 | 11/2017 | Asakura |
| 2017/0315556 A1 | 11/2017 | Mimura |
| 2017/0334460 A1 | 11/2017 | Arakawa et al. |
| 2017/0341652 A1 | 11/2017 | Sugawara et al. |
| 2017/0341653 A1 | 11/2017 | Kubota et al. |
| 2017/0349212 A1 | 12/2017 | Oshida et al. |
| 2017/0368936 A1 | 12/2017 | Kojima |
| 2018/0009437 A1 | 1/2018 | Ooba |
| 2018/0029604 A1* | 2/2018 | Niino .................... B60W 10/20 |
| 2018/0033309 A1 | 2/2018 | Norwood |
| 2018/0043906 A1 | 2/2018 | Huang |
| 2018/0046185 A1 | 2/2018 | Sato et al. |
| 2018/0050659 A1 | 2/2018 | Coburn |
| 2018/0074497 A1 | 3/2018 | Tsuji et al. |
| 2018/0088574 A1 | 3/2018 | Latotzki et al. |
| 2018/0091085 A1 | 3/2018 | Tamagaki et al. |
| 2018/0111628 A1 | 4/2018 | Tamagaki et al. |
| 2018/0154939 A1 | 6/2018 | Aoki |
| 2018/0157038 A1 | 6/2018 | Kabe |
| 2018/0162416 A1 | 6/2018 | Honda et al. |
| 2018/0170370 A1 | 6/2018 | Kataoka |
| 2018/0178713 A1 | 6/2018 | Fujii |
| 2018/0178714 A1 | 6/2018 | Fujii |
| 2018/0178715 A1 | 6/2018 | Fujii |
| 2018/0178716 A1 | 6/2018 | Fujii |
| 2018/0178801 A1 | 6/2018 | Hashimoto et al. |
| 2018/0178802 A1 | 6/2018 | Miyata |
| 2018/0186376 A1 | 7/2018 | Lee et al. |
| 2018/0188735 A1 | 7/2018 | Sugawara et al. |
| 2018/0194280 A1 | 7/2018 | Shibata et al. |
| 2018/0197414 A1 | 7/2018 | Oooka |
| 2018/0209801 A1 | 7/2018 | Stentz et al. |
| 2018/0215387 A1 | 8/2018 | Takae |
| 2018/0222422 A1 | 8/2018 | Takae |
| 2018/0222423 A1 | 8/2018 | Takae et al. |
| 2018/0237030 A1 | 8/2018 | Jones et al. |
| 2018/0239352 A1 | 8/2018 | Wang et al. |
| 2018/0251155 A1 | 9/2018 | Chan et al. |
| 2018/0257669 A1 | 9/2018 | Makke et al. |

(56) References Cited

U.S. PATENT DOCUMENTS

| | | |
|---|---|---|
| 2018/0281788 A1 | 10/2018 | Uchida |
| 2018/0290666 A1 | 10/2018 | Ichikawa et al. |
| 2018/0292820 A1 | 10/2018 | Markberger |
| 2018/0297638 A1 | 10/2018 | Fujii |
| 2018/0297639 A1 | 10/2018 | Fujii |
| 2018/0297640 A1 | 10/2018 | Fujii |
| 2018/0339708 A1 | 11/2018 | Geller |
| 2018/0345959 A1 | 12/2018 | Fujii |
| 2018/0345960 A1 | 12/2018 | Fujii |
| 2018/0345964 A1 | 12/2018 | Fujii et al. |
| 2018/0346027 A1 | 12/2018 | Fujii |
| 2018/0348758 A1 | 12/2018 | Nakamura et al. |
| 2018/0350242 A1 | 12/2018 | Fujii |
| 2018/0354519 A1 | 12/2018 | Miyata |
| 2018/0362013 A1* | 12/2018 | Ungermann ............ B60T 7/085 |
| 2018/0370542 A1 | 12/2018 | Braunagel et al. |
| 2018/0370544 A1 | 12/2018 | Kitagawa |
| 2018/0373250 A1 | 12/2018 | Nakamura et al. |
| 2019/0005823 A1 | 1/2019 | Fujiki et al. |
| 2019/0026918 A1 | 1/2019 | Gomezcaballero et al. |
| 2019/0047469 A1 | 2/2019 | Nishiguchi et al. |
| 2019/0047561 A1 | 2/2019 | Nishiguchi et al. |
| 2019/0049958 A1 | 2/2019 | Liu et al. |
| 2019/0061766 A1 | 2/2019 | Nishiguchi |
| 2019/0071099 A1 | 3/2019 | Nishiguchi |
| 2019/0106108 A1 | 4/2019 | Wienecke et al. |
| 2019/0126923 A1 | 5/2019 | Taie et al. |
| 2019/0126927 A1 | 5/2019 | Uejima |
| 2019/0135290 A1 | 5/2019 | Marden et al. |
| 2019/0155279 A1 | 5/2019 | Tayama |
| 2019/0161117 A1 | 5/2019 | Suzuki |
| 2019/0168754 A1 | 6/2019 | Makled et al. |
| 2019/0185005 A1 | 6/2019 | Fukuda |
| 2019/0196481 A1 | 6/2019 | Tay et al. |
| 2019/0197497 A1 | 6/2019 | Abari et al. |
| 2019/0212443 A1 | 7/2019 | Nomura et al. |
| 2019/0235504 A1 | 8/2019 | Carter et al. |
| 2019/0241158 A1 | 8/2019 | Ghannam et al. |
| 2019/0241198 A1 | 8/2019 | Mori et al. |
| 2019/0250620 A1 | 8/2019 | Huang et al. |
| 2019/0256064 A1 | 8/2019 | Hecker et al. |
| 2019/0263411 A1 | 8/2019 | Saikyo et al. |
| 2019/0265712 A1 | 8/2019 | Satzoda et al. |
| 2019/0279507 A1 | 9/2019 | Oshisaka et al. |
| 2019/0283757 A1 | 9/2019 | Honda et al. |
| 2019/0285726 A1 | 9/2019 | Muto |
| 2019/0291642 A1 | 9/2019 | Chae et al. |
| 2019/0291728 A1 | 9/2019 | Shalev-Shwartz et al. |
| 2019/0302768 A1 | 10/2019 | Zhang et al. |
| 2019/0315362 A1 | 10/2019 | Um et al. |
| 2019/0317494 A1 | 10/2019 | Lee et al. |
| 2019/0325758 A1 | 10/2019 | Yoshii et al. |
| 2019/0359202 A1 | 11/2019 | Zhu et al. |
| 2019/0391580 A1 | 12/2019 | Cairano et al. |
| 2020/0001714 A1 | 1/2020 | Kojima |
| 2020/0049513 A1 | 2/2020 | Ma |
| 2020/0073396 A1 | 3/2020 | Shimizu |
| 2020/0172123 A1 | 6/2020 | Kubota et al. |
| 2020/0180638 A1 | 6/2020 | Kanoh |
| 2020/0189618 A1 | 6/2020 | Ochida et al. |
| 2020/0269747 A1 | 8/2020 | Kusayanagi et al. |
| 2020/0269880 A1 | 8/2020 | Tokita |
| 2020/0301431 A1 | 9/2020 | Matsubara et al. |
| 2020/0307634 A1 | 10/2020 | Yashiro |
| 2020/0312155 A1 | 10/2020 | Kelkar et al. |
| 2020/0391593 A1 | 12/2020 | Lee et al. |
| 2021/0188258 A1 | 6/2021 | Goto et al. |
| 2021/0188356 A1 | 6/2021 | Goto et al. |

FOREIGN PATENT DOCUMENTS

| | | |
|---|---|---|
| DE | 102004005815 B3 | 6/2005 |
| DE | 10 2004 048 468 A1 | 4/2006 |
| DE | 10 2007 005 245 A1 | 11/2007 |
| DE | 10 2011 016 770 A1 | 11/2011 |
| DE | 10 2011 016 771 A1 | 10/2012 |
| DE | 10 2012 001405 A1 | 11/2012 |
| DE | 10 2011 109618 A1 | 2/2013 |
| DE | 10 2012 008090 A1 | 10/2013 |
| DE | 10 2014 225 680 A1 | 6/2016 |
| DE | 10 2015 205131 A1 | 9/2016 |
| DE | 102016202946 A1 | 9/2016 |
| DE | 102015206969 A1 | 10/2016 |
| DE | 102015209476 A1 | 11/2016 |
| DE | 102015219231 A1 | 4/2017 |
| DE | 10 2016 007187 A1 | 6/2017 |
| DE | 102015224244 A1 | 6/2017 |
| DE | 10 2016 215565 A1 | 2/2018 |
| DE | 10 2016 216134 A1 | 3/2018 |
| EP | 1074904 A1 | 2/2001 |
| EP | 1607264 A1 | 12/2005 |
| EP | 2116984 A1 | 11/2009 |
| EP | 2657921 A1 | 10/2013 |
| EP | 2978648 A1 | 2/2016 |
| EP | 3075618 A2 | 10/2016 |
| EP | 3239960 A1 | 11/2017 |
| EP | 3 264 211 A1 | 1/2018 |
| EP | 3284646 A1 | 2/2018 |
| EP | 3075618 A3 | 5/2018 |
| EP | 19167267.4 | 8/2021 |
| JP | 2000-198458 A | 7/2000 |
| JP | 2003-025868 A | 1/2003 |
| JP | 2015-138330 A | 7/2015 |
| JP | 2016-000602 A | 1/2016 |
| JP | 2016-151815 A | 8/2016 |
| JP | 2016-196285 A | 11/2016 |
| JP | 2019-043169 A | 3/2019 |
| KR | 100578573 B2 | 5/2006 |
| KR | 101779823 B1 | 10/2017 |
| KR | 20180070401 A | 6/2018 |
| WO | WO 2010-088869 A1 | 8/2010 |
| WO | WO 2012-131405 A1 | 10/2012 |
| WO | WO 2014-154771 A1 | 10/2014 |
| WO | WO 2017-018133 A1 | 2/2017 |
| WO | WO 2017064941 A1 | 4/2017 |
| WO | WO 2017-168013 A1 | 10/2017 |
| WO | WO 2017168013 A1 | 10/2017 |
| WO | WO 2018-033389 A1 | 2/2018 |
| WO | WO 2017-017793 A1 | 6/2018 |

OTHER PUBLICATIONS

European Search Report dated Apr. 21, 2020 from the corresponding European Application No. 19167270.8, 8 pages.
U.S. Office Action dated Feb. 4, 2020 from the corresponding U.S. Appl. No. 16/296,890, 19 pp.
U.S. Office Action dated Mar. 25, 2020 from the corresponding U.S. Appl. No. 16/204,362, 27 pp.
U.S. Office Action dated Apr. 24, 2020 from the corresponding U.S. Appl. No. 16/203,884, 25 pp.
European Search Report dated Oct. 2, 2019 from the corresponding European Application No. 19163402.1, 10 pages.
European Search Report dated Oct. 2, 2019 from the corresponding European Application No. 19162795.9, 8 pages.
European Search Report dated Oct. 14, 2019 from the corresponding European Application No. 19161253.0, 11 pages.
European Search Report dated Oct. 18, 2019 from the corresponding European Application No. 19167268.2, 8 pages.
European Search Report dated Oct. 23, 2019 from the corresponding European Application No. 19167266.6, 9 pages.
U.S. Office Action for U.S. Appl. No. 16/204,362 dated Oct. 16, 2019, 32 pages.
European Search Report dated Jul. 1, 2019 from the corresponding European Application No. 18210398.6, 9 pages.
European Search Report dated Jul. 3, 2019 from the corresponding European Application No. 18210063.6, 10 pages.
European Search Report dated Jul. 18, 2019 from the corresponding European Application No. 18210400.0, 5 pages.
European Search Report dated Jul. 22, 2019 from the corresponding European Application No. 18210403.4, 8 pages.

(56) References Cited

OTHER PUBLICATIONS

European Search Report dated Jul. 22, 2019 from the corresponding European Application No. 18210401.8, 8 pages.
European Search Report dated Jul. 25, 2019 from the corresponding European Application No. 18209168.6, 9 pages.
European Search Report dated Jul. 25, 2019 from the corresponding European Application No. 19156387.3, 8 pages.
European Search Report dated Aug. 2, 2019 from the corresponding European Application No. 19167271.6, 8 pages.
European Search Report dated Aug. 22, 2019 from the corresponding European Application No. 19167263.3, 8 pages.
European Search Report dated Aug. 30, 2019 from the corresponding European Application No. 19167269.0, 9 pages.
European Search Report dated Aug. 30, 2019 from the corresponding European Application No. 19167267.4, 8 pages.
Office Action dated Aug. 12, 2020 from the corresponding U.S. Appl. No. 16/192,279, 60 pages.
Notice of Allowance dated Sep. 4, 2020 from the corresponding U.S. Appl. No. 16/203,884, 15 pages.
Office Action issued on Sep. 15, 2020 from the corresponding U.S. Appl. No. 16/206,170, 23 pages.
European Search Report dated May 11, 2020 from the corresponding European Application No. 19167265.8, 9 pages.
Office Action for U.S. Appl. No. 16/204,400 dated Jun. 1, 2020, 44 pages.
Notice of Allowance for U.S. Appl. No. 16/204,362 dated Jul. 9, 2020, 21 pages.
Office Action dated Dec. 10, 2020 from the corresponding U.S. Appl. No. 16/269,140, 31 pp.
Office Action dated Dec. 14, 2020 from the corresponding U.S. Appl. No. 16/378,203, 49 pp.
Notice of Allowance dated Dec. 28, 2020 from the corresponding U.S. Appl. No. 16/206,170, 16 pp.
Office Action dated Jan. 25, 2021 from the corresponding U.S. Appl. No. 16/192,279, 38 pp.
Notice of Allowance dated Jan. 25, 2021 from the corresponding U.S. Appl. No. 16/372,937, 31 pp.
Office Action dated Jan. 27, 2021 from the corresponding U.S. Appl. No. 16/299,547, 29 pp.
Office Action dated Feb. 11, 2021 from the corresponding U.S. Appl. No. 16/376,661, 24 pp.
Office Action dated Feb. 17, 2021 from the corresponding U.S. Appl. No. 16/204,324, 30 pp.
Office Action dated Feb. 17, 2021 from the corresponding U.S. Appl. No. 16/376,576, 56 pp.
Office Action dated Mar. 17, 2021 from the corresponding U.S. Appl. No. 16/378,181, 14 pp.
Notice of Allowance dated Mar. 23, 2021 from the corresponding U.S. Appl. No. 16/269,140, 9 pp.
Office Action dated Mar. 26, 2021 from the corresponding U.S. Appl. No. 16/376,612, 29 pp.
Office Action dated Apr. 15, 2021 from the corresponding U.S. Appl. No. 16/290,376, 27 pp.
Office Action dated Apr. 22, 2021 from the corresponding U.S. Appl. No. 16/378,203, 35 pp.
Notice of Allowance dated May 19, 2021 from the corresponding U.S. Appl. No. 16/204,324, 13 pp.
Notice of Allowance dated May 27, 2021 from the corresponding U.S. Appl. No. 16/376,661, 10 pp.
Office Action dated Jun. 1, 2021 from the corresponding U.S. Appl. No. 16/192,279, 39 pp.

* cited by examiner

APPARATUS AND METHOD FOR PROVIDING SAFETY STRATEGY IN VEHICLE

CROSS-REFERENCE TO RELATED APPLICATION

This application claims the benefit of and priority to Korean Patent Application No. 10-2018-0140867, filed on Nov. 15, 2018, which claims priority to and the benefit of U.S. Provisional Patent Application No. 62/655,831, filed on Apr. 11, 2018, the entire contents of both of which are incorporated herein by reference.

FIELD

The present disclosure relates to an apparatus and method for providing a strategy for the maintenance of safety depending on a state of a driver of a vehicle.

BACKGROUND

The statements in this section merely provide background information related to the present disclosure and may not constitute prior art.

With the development of the auto industry, an autonomous system and a driving assistance system which facilitates partially autonomous driving (hereinafter, for convenience of description, both of autonomous driving and driving assistance are referred to as "autonomous driving") have been developed. The autonomous system may provide a variety of functions, for example, setting speed keeping, vehicle-to-vehicle distance keeping, lane keeping, and a lane change. The autonomous system may perform autonomous driving using various devices such as a sensor for sensing environments outside the vehicle, a sensor for sensing information about the vehicle, a global positioning system (GPS), a detailed map, a driver state monitoring system, a steering actuator, an acceleration/deceleration actuator, a communication circuit, and a control circuit (e.g., an electronic control unit (ECU)). The autonomous system may monitor a state of a driver and may provide a suitable minimum risk maneuver (MRM) depending on the state of the driver.

It may be difficult to provide for the safety of a driver, when an MRM is provided, when speed and lane keeping are controlled in a lane where the vehicle is traveling, or when deceleration or stopping is controlled. Thus, a system capable of providing an automatic lane change function may consider providing a strategy capable of increasing the safety of the driver.

SUMMARY

An aspect of the present disclosure provides an apparatus and method for providing a safety strategy for providing for the safety of a driver using an automatic lane change function.

According to an aspect of the present disclosure, an apparatus for providing a safety strategy in a vehicle may include: a sensor configured to obtain information about a driver of the vehicle, an output device configured to output a notification to the driver, and a control circuit configured to be electrically connected with the sensor and the output device. The control circuit may be configured to recognize a state of the driver based on the information obtained by the sensor, set a route which is toward a safety zone, when the state of the driver meets a specified condition, and control the vehicle to change a lane where the vehicle is traveling to a lane adjacent to the safety zone.

According to one aspect, the safety zone may include a rest area, a shelter in a road where the vehicle is traveling, or a shoulder.

According to one aspect, the control circuit may be configured to output a transition demand (TD) using the output device, when the lane where the vehicle is traveling is changed to the lane adjacent to the safety zone.

According to one aspect, the control circuit may be configured to change the lane where the vehicle is traveling to the lane adjacent to the safety zone within a specified time interval and output a TD using the output device after the specified time interval.

According to one aspect, the control circuit may be configured to output a TD using the output device, after the lane where the vehicle is traveling is changed to the lane adjacent to the safety zone and control the vehicle to enter the safety zone, when control authority is not handed over to the driver.

According to one aspect, the control circuit may be configured to output a TD using the output device after a specified time interval from a time when the state of the driver meets the specified condition and control the vehicle to enter the safety zone, when control authority is not handed over to the driver.

According to one aspect, the control circuit may be configured to search for the route which is toward the safety zone the vehicle is able to enter within a specified time interval.

According to one aspect, the control circuit may be configured to, when a plurality of safety zones are found, set a route which is toward the nearest safety zone from the vehicle among the plurality of safety zones.

According to one aspect, the control circuit may be configured to provide vehicle control or a notification to guide the driver to change the state of the driver, when the state of the driver meets the specified condition.

According to one aspect, the control circuit may be configured to control the vehicle to move to a lane located at a left end or a right end within the road where the vehicle is traveling.

According to one aspect, the safety zone may include a lane in a specified location among a plurality of lanes included in the road where the vehicle is traveling. The control circuit may be configured to control the vehicle to change the lane where the vehicle is traveling to the lane in the specified location.

According to another aspect of the present disclosure, a method for providing a safety strategy in a vehicle may include: recognizing a state of a driver of the vehicle based on information obtained in the vehicle, setting a route which is toward a safety zone, when the state of the driver meets a specified condition, and controlling the vehicle to change a lane where the vehicle is traveling to a lane adjacent to the safety zone.

According to one aspect, the method may further include outputting a transition demand (TD), when the lane where the vehicle is traveling is changed to the lane adjacent to the safety zone.

According to one aspect, the controlling may include controlling the vehicle to change the lane where the vehicle is traveling to the lane adjacent to the safety zone within a specified time interval. The method may further include outputting a TD after the specified time interval.

According to one aspect, the method may further include outputting a TD, after the lane where the vehicle is traveling is changed to the lane adjacent to the safety zone and controlling the vehicle to enter the safety zone, when control authority is not handed over to the driver.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
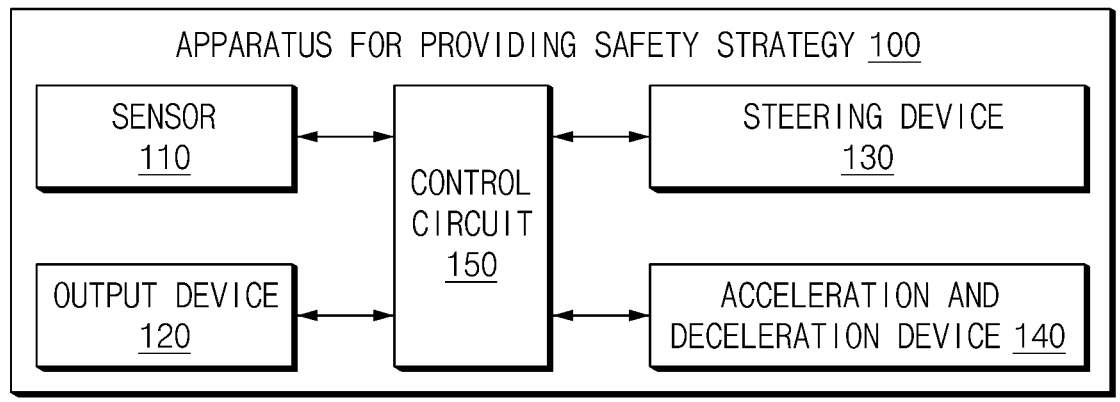
FIG. 1 is a block diagram illustrating a configuration of an apparatus for providing a safety strategy in a vehicle according to one aspect of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing one aspect of the present disclosure, if it is determined that a detailed description of related well-known configurations or functions blurs the gist of one aspect of the present disclosure, it will be omitted.

In describing elements of embodiments of the present disclosure, the terms $1^{st}$, $2^{nd}$ first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for providing a safety strategy in a vehicle according to one aspect of the present disclosure.

Referring to FIG. 1, an apparatus 100 for providing a safety strategy according to one aspect may include a sensor 110, an output device 120, a steering device 130, an acceleration and deceleration device 140, and a control circuit 130. The apparatus 100 for providing the safety strategy in FIG. 1 may be a portion of an autonomous system and may be loaded into the vehicle.

The sensor 110 may be configured to obtain information about a driver of the vehicle. The sensor 110 may obtain information for monitoring a state of the driver (e.g., validity of the driver). For example, the sensor 110 may include a camera, a touch sensor, a proximity sensor, an infrared sensor, and/or the like.

The output device 120 may be configured to output a notification to the driver. For example, the output device 120 may include a display, a speaker, a haptic module, and/or the like.

The steering device 130 may be configured to control a steering angle of the vehicle. The steering device 130 may include, for example, a steering wheel, an actuator interlocked with the steering wheel, and a controller for controlling the actuator, and may be controlled by the driver and/or the autonomous system.

The acceleration and deceleration device 140 may be configured to control a speed of the vehicle. The acceleration and deceleration device 140 may include, for example, a throttle, a brake, an actuator interlocked with the throttle and the brake, and a controller for controlling the actuator, and may be controlled by the driver and/or the autonomous system.

The control circuit 150 may be electrically connected with the sensor 110, the output device 120, the steering device 130, and the acceleration and deceleration device 140. The control circuit 150 may control the sensor 110, the output device 120, the steering device 130, and the acceleration and deceleration device 140 and may perform a variety of data processing and various arithmetic operations. The control circuit 150 may be, for example, an electronic control unit (ECU), a micro controller unit (MCU), or a sub-controller, which is loaded into the vehicle.

According to one aspect, the control circuit 150 may recognize a state of the driver based on the information obtained by the sensor 110. For example, the control circuit 150 may continue monitoring validity of the driver (e.g., whether the driver pays attention to driving the vehicle, whether the driver looks ahead of the vehicle, whether the driver holds a steering wheel of the vehicle, whether the driver opens his or her eyes, or the like).

According to one aspect, the control circuit 150 may determine whether the state of the driver meets a specified condition. For example, when the validity of the driver is not detected, the control circuit 150 may determine that the specified condition is met.

According to one aspect, when the state of the driver meets the specified condition, the control circuit 150 may set a route which is toward a safety zone. When the validity of the driver is not detected, because the vehicle is in a critical state, the control circuit 150 may generate a route, which is toward the safety zone, in advance to provide a minimum risk maneuver (MRM) at a later time. The safety zone may include, for example, a rest area, a shelter in a road where the vehicle is traveling, or a shoulder. For another example, the safety zone may include a lane in a specified location (e.g., the other lanes except for a passing lane, a left-end lane, or a right-end lane) among a plurality of lanes included in a road where the vehicle is traveling. The control circuit 150 may search for a route, which is toward the safety zone, the vehicle may enter within a specified time interval (e.g., 3 minutes). When a plurality of safety zones are found, the control circuit 150 may generate a route which is toward the safety zone which is nearest from the vehicle among the plurality of safety zones.

According to one aspect, when the state of the driver meets the specified condition, the control circuit 150 may provide vehicle control or a notification to guide the driver to change his or her state. Independently of providing an MRM, the vehicle may make an attempt to provide for the safety of the driver by awakening the driver. For example, the control circuit 150 may provide a notification using the speaker, the haptic module, or the like and may control the vehicle in a longitudinal direction and/or in a lateral direction such that strong acceleration occurs.

According to one aspect, the control circuit 150 may control the vehicle to change the lane where the vehicle is traveling to a lane adjacent to the safety zone. When the validity of the driver is not detected, before generating a transition demand (TD), the control circuit 150 may change the lane where the vehicle is traveling to the lane adjacent to the set safety zone. When the driver does not take over control authority within a specified time after the TD is provided, the control circuit 150 may move the vehicle to the safety zone along the set route. In this case, when the vehicle enters a safety zone, such as a rest area, immediately from a first lane of a road including three lanes, a critical situation may occur. Thus, the control circuit 150 may enhance safety when executing an MRM, by changing the lane where the vehicle is traveling to a lane adjacent to the safety zone in advance. For example, the control circuit 150 may control the vehicle to move to a lane located at a left or right end in the lane where the vehicle is traveling. For another example, the control circuit 150 may control the vehicle to change the lane where the vehicle is traveling to a lane which is in a specified location (e.g., the other lanes except for a passing lane, a left-end lane, or a right-end lane). For another example, the control circuit 150 may control the vehicle to change the lane where the vehicle is traveling to a lane with the lowest average speed among a plurality of lanes included in the lane where the vehicle is traveling.

According to one aspect, when (or after) the lane where the vehicle is traveling is changed to the lane adjacent to the safety zone, the control circuit 150 may output a TD using the output device 120. According to one aspect, the control circuit 150 may change the lane where the vehicle is traveling to the lane adjacent to the safety zone within a specified time after a time when the state of the driver meets the specified condition and may output the TD using the output device 120 after the specified time interval.

According to one aspect, when control authority is not handed over to the driver during a specified time interval (e.g., 8 seconds to 15 seconds) after the outputting of the TD is initiated, the control circuit 150 may control the vehicle to enter the safety zone. Because the vehicle is traveling on the lane adjacent to the safety zone in advance when the TD occurs, the control circuit 150 may easily control the vehicle to enter the safety zone.

Figure 2:
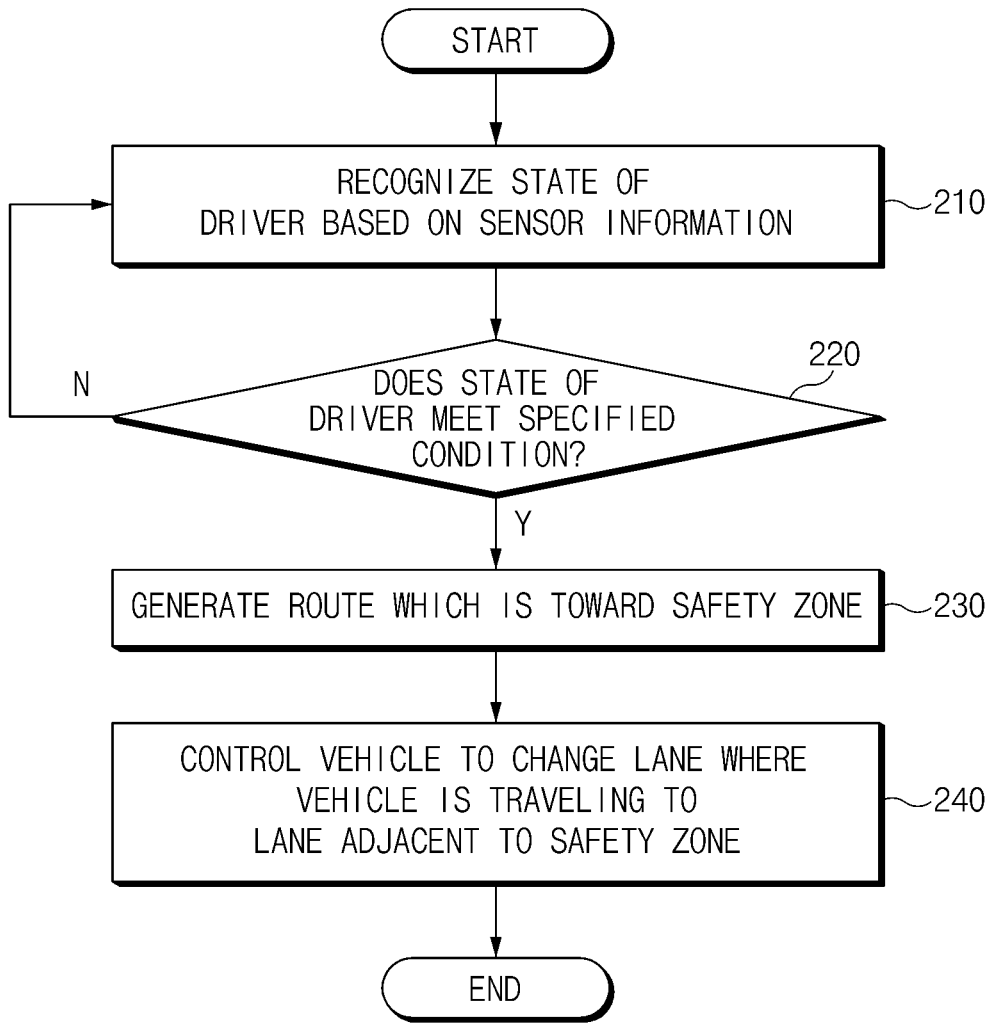
FIG. 2 is a flowchart illustrating a method for providing a safety strategy in a vehicle according to one aspect of the present disclosure.

FIG. 2 is a flowchart illustrating a method for providing a safety strategy in a vehicle according to one aspect of the present disclosure.

Hereinafter, it is assumed that a vehicle including an apparatus 100 for providing a safety strategy in FIG. 1 performs a process of FIG. 2. Furthermore, in a description of FIG. 2, an operation described as being performed by the vehicle may be understood as being controlled by a control circuit 150 of the apparatus 100 for providing the safety strategy.

Referring to FIG. 2, in operation 210, the vehicle may recognize a state of a driver based on sensor information. For example, the vehicle may monitor validity of the user using its sensor.

In operation 220, the vehicle may determine whether the state of the driver meets a specified condition. For example, when the validity of the driver is not detected, the vehicle may determine that the specified condition is met.

In operation 230, the vehicle may generate a route which is toward the safety zone. For example, the vehicle may generate a route which is toward a rest area, a shelter, a shoulder, or the like to provide an MRM at a later time.

In operation 240, the vehicle may control the vehicle to change a lane where the vehicle is traveling to a lane adjacent to the safety zone. For example, to provide safety when executing the MRM, the vehicle may move to the lane adjacent to the safety zone in advance.

Figure 3:
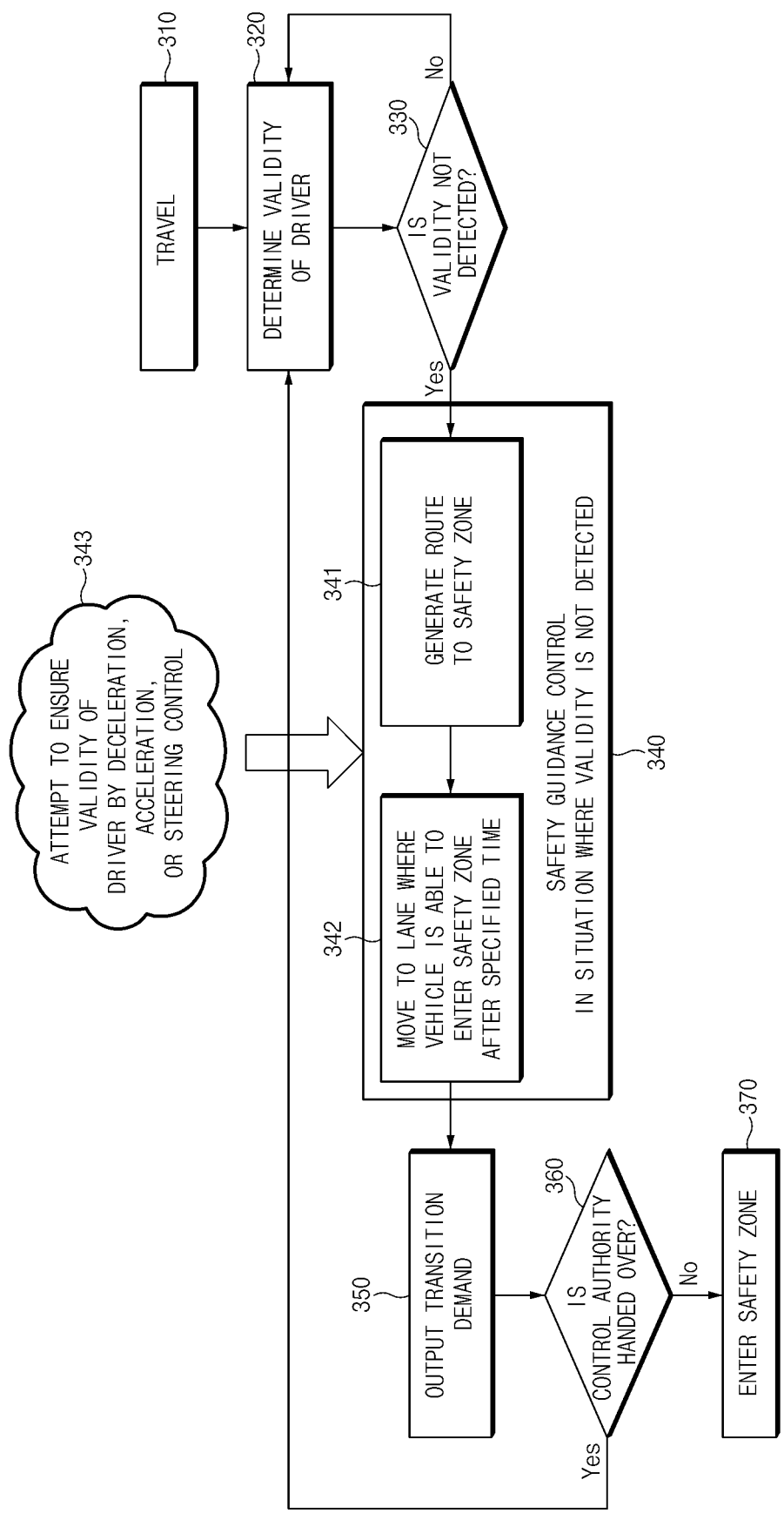
FIG. 3 is a flowchart illustrating a method for providing a safety strategy in a vehicle according to one aspect of the present disclosure.

FIG. 3 is a flowchart illustrating a method for providing a safety strategy in a vehicle according to one aspect of the present disclosure.

Hereinafter, it is assumed that a vehicle including an apparatus 100 for providing a safety strategy in FIG. 1 performs a process of FIG. 3. Furthermore, in a description of FIG. 3, an operation described as being performed by the vehicle may be understood as being controlled by a control circuit 150 of the apparatus 100 for providing the safety strategy.

Referring to FIG. 3, in operation 310, the vehicle may travel using its autonomous system. In operation 320, the vehicle may determine validity of its driver using data collected by its sensor. The vehicle may continue monitoring the validity of the driver.

When it is determined that the validity is not detected in operation 330, in operation 340, the vehicle may perform safety guidance control. In detail, in operation 341, the vehicle may generate a route toward a safety zone. In operation 342, the vehicle may move to a lane where the vehicle is able to enter the safety zone (e.g., a lane neighboring to the safety zone) after a specified time. While performing the safety guidance control, in operation 343, the vehicle may attempt to provide for the validity of the driver through deceleration, acceleration, or steering control.

In operation 350, the vehicle may output a TD. When it is determined that control authority is not handed over to the driver in operation 360, in operation 370, the vehicle may enter the safety zone.

Figure 4:
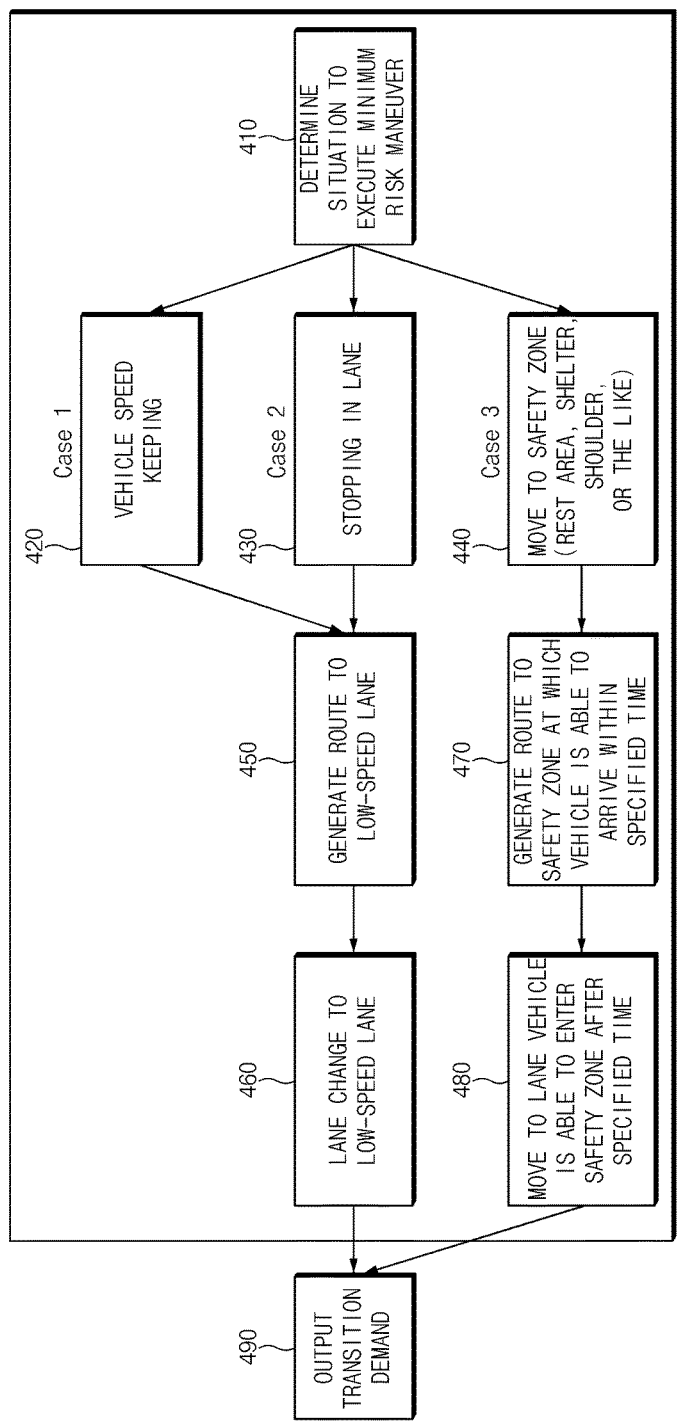
FIG. 4 is a drawing illustrating a method for providing a safety strategy in a vehicle according to one aspect of the present disclosure.

FIG. 4 is a drawing illustrating a method for providing a safety strategy in a vehicle according to one aspect of the present disclosure.

Hereinafter, it is assumed that a vehicle including an apparatus 100 for providing a safety strategy in FIG. 1 performs a process of FIG. 4. Furthermore, in a description of FIG. 4, an operation described as being performed by the vehicle may be understood as being controlled by a control circuit 150 of the apparatus 100 for providing the safety strategy.

Referring to FIG. 4, in operation 410, the vehicle may determine whether there is a situation to execute an MRM (e.g., whether validity of a driver of the vehicle is not detected). The vehicle may select a strategy for one of vehicle speed keeping (case 1) in operation 420, stopping in a lane (case 2) in operation 430, or movement to a safety zone (case 3) in operation 440.

When the strategy for the vehicle speed keeping or the stopping in the lane is selected, in operation 450, the vehicle may generate a route to a low-speed lane. The low-speed lane may be, for example, a lane except for a passing lane, a left-end lane, or a right-end lane. For another example, the low-speed lane may be a lane with the lowest average speed of vehicles which are traveling on a road. In operation 460, the vehicle may perform lane change control to the low-speed lane. In operation 490, the vehicle may output a TD. When control authority is not handed over to the driver, the vehicle may perform speed keeping or stopping control on the low-speed lane.

When the strategy for the movement to the safety zone is selected, in operation 470, the vehicle may generate a route to the safety zone at which the vehicle is able to arrive within a specified time. In operation 480, the vehicle may move to a lane where the vehicle is able to enter the safety zone after the specified time. In operation 490, the vehicle may output a TD. When control authority is not handed over to the driver, the vehicle may enter the safety zone from a lane adjacent to the safety zone.

Figure 5:
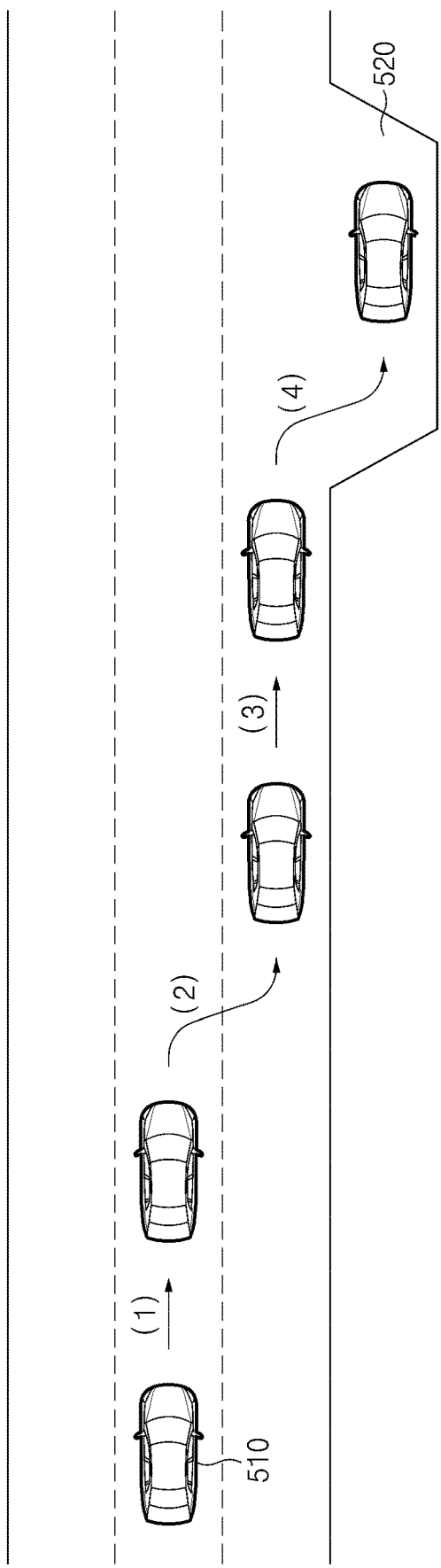
FIG. 5 is a drawing illustrating an exemplary operation of an apparatus for providing a safety strategy in a vehicle according to one aspect of the present disclosure.

FIG. 5 is a drawing illustrating an exemplary operation of an apparatus for providing a safety strategy in a vehicle according to one aspect of the present disclosure.

Referring to FIG. 5, a vehicle 510 according to one aspect may travel using its autonomous system (or its driving assistance system) (1). When a state of a driver of the vehicle 510 meets a specified condition, the vehicle 510 may set a route which is toward a sleeping shelter 520 connected with a road where the vehicle 510 is traveling. The vehicle 510 may change a lane where the vehicle 510 is traveling to a lane neighboring to the sleeping shelter 520 (2). After the state of the driver meets the specified condition, when a specified time interval elapses (or when the change of the lane where the vehicle 510 is traveling is completed), the vehicle 510 may output a TD (3). When control authority is not handed over to the driver within a specified time interval after the TD is output, the vehicle 510 may enter the sleeping shelter 520 (4). In FIG. 5, one aspect is exemplified as the safety zone is the sleeping shelter 520. However, the disclosure is not limited thereto. For example, the safety zone may be another place such as a rest area.

Figure 6:
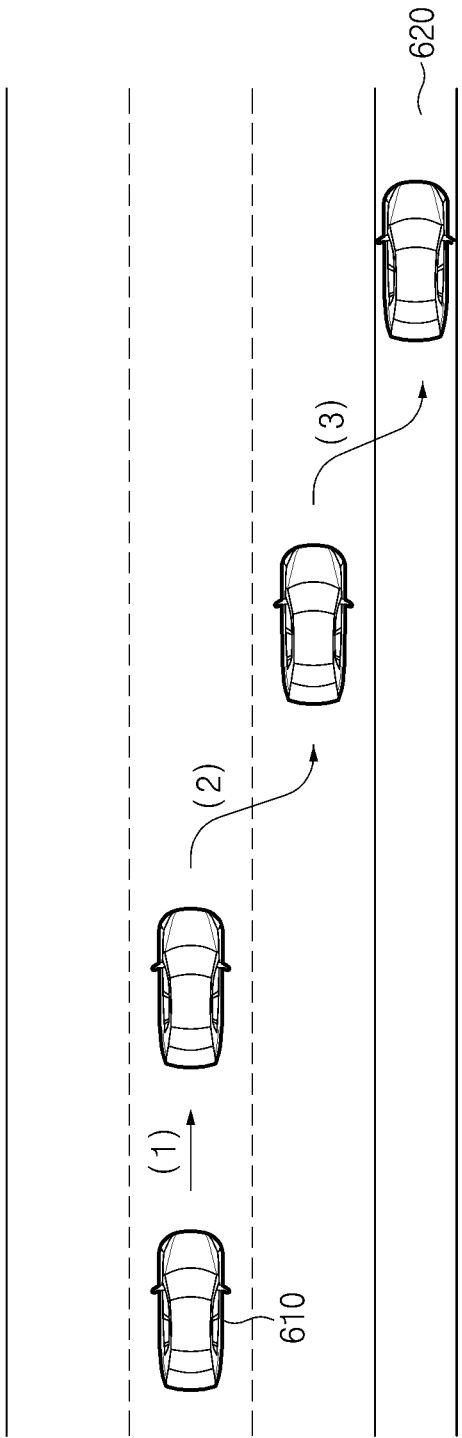
FIG. 6 is a drawing illustrating an exemplary operation of an apparatus for providing a safety strategy in a vehicle according to one aspect of the present disclosure.

FIG. 6 is a drawing illustrating an exemplary operation of an apparatus for providing a safety strategy in a vehicle according to one aspect of the present disclosure.

Referring to FIG. 6, a vehicle 610 according to one aspect may travel using its autonomous system (or its driving assistance system) (1). When a state of a driver of the vehicle 610 meets a specified condition, the vehicle 610 may set a route which is toward a shoulder 620 in a road where the vehicle 610 is traveling. The vehicle 610 may change the lane where the vehicle 610 is traveling to a lane neighboring to the shoulder 620 (2). After the state of the driver meets the specified condition, when a specified time interval elapses (or when the changing of the lane where the vehicle 610 is traveling is completed), the vehicle 610 may output a TD. When control authority is not handed over to the driver within a specified time interval after outputting the TD, the vehicle 610 may enter the shoulder 620 (3).

Figure 7:
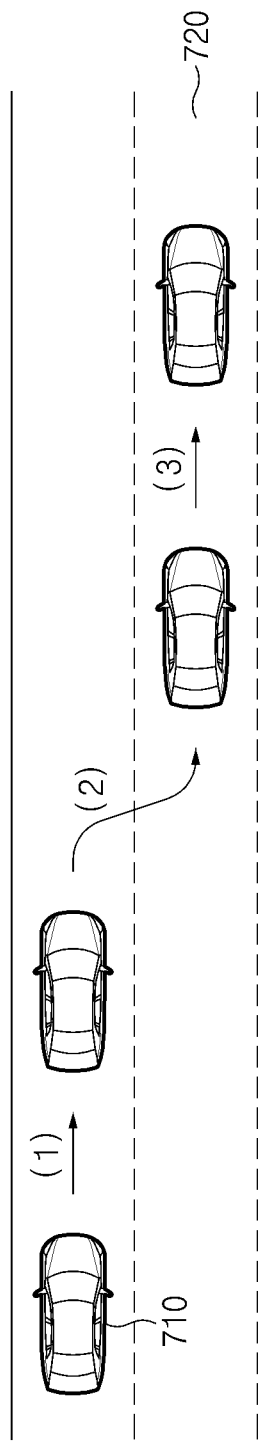
FIG. 7 is a drawing illustrating an exemplary operation of an apparatus for providing a safety strategy in a vehicle according to one aspect of the present disclosure.

FIG. 7 is a drawing illustrating an exemplary operation of an apparatus for providing a safety strategy in a vehicle according to one aspect of the present disclosure.

Referring to FIG. 7, a vehicle 710 according to one aspect may travel using its autonomous system (or its driving assistance system) (1). When a state of a driver of the vehicle 710 meets a specified condition, the vehicle 610 may set a route which is toward a low-speed lane 720 in a road where the vehicle 710 is traveling. The vehicle 710 may change the lane where the vehicle 710 is traveling to a lane neighboring to the low-speed lane 720 (2). After the state of the driver meets the specified condition, when a specified time interval elapses (or when the changing of the lane where the vehicle 610 is traveling is completed), the vehicle 710 may output a TD. When control authority is not handed over to the driver within a specified time interval after outputting the TD, the vehicle 710 may control stopping, deceleration, or speed keeping in the low-speed lane 720 (3).

Figure 8:
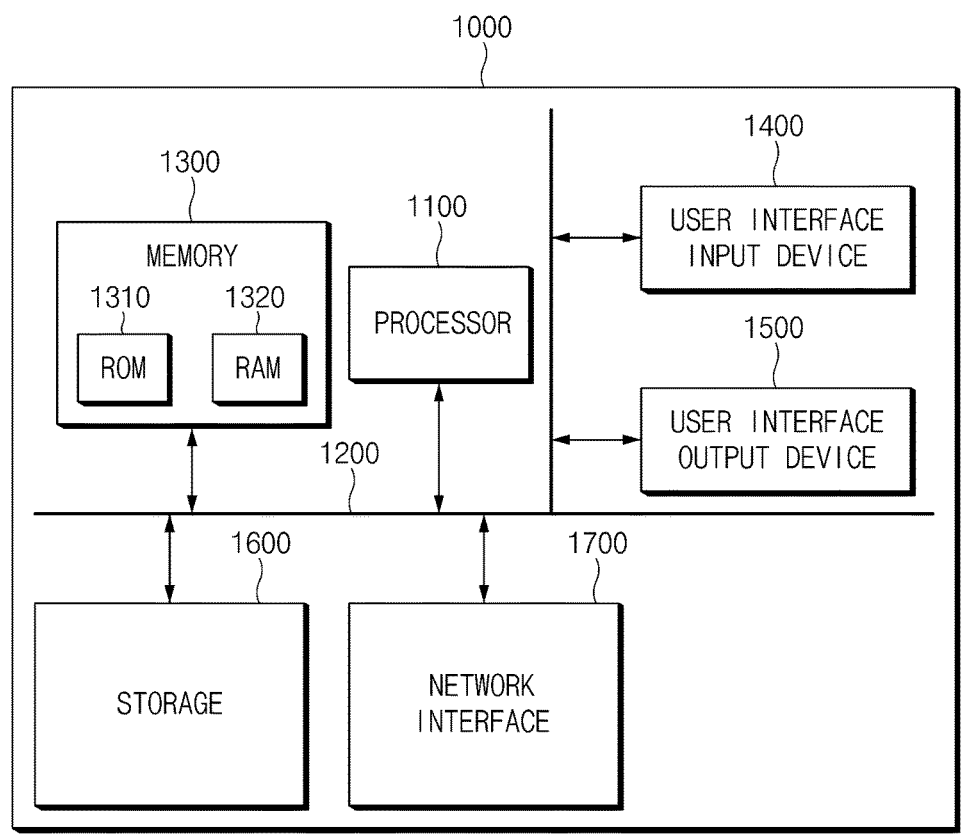
FIG. 8 is a block diagram illustrating a configuration of a computing system according to one aspect of the present disclosure.

FIG. 8 is a block diagram illustrating a configuration of a computing system according to one aspect of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for performing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus for providing the safety strategy in the vehicle according to one aspect of the present disclosure may provide a safety strategy for providing for the safety of the driver by changing the lane where the vehicle is traveling to a lane adjacent to the safety zone in advance when the state of the driver is unsuitable for driving the vehicle.

In addition, various effects directly or indirectly ascertained through the present disclosure may be provided.

The present disclosure has been described with reference to certain aspects and the accompanying drawings, but the present disclosure is not limited thereto and may be variously modified and altered by those skilled in the art to which the present disclosure pertains without departing from the spirit and scope of the present disclosure.

What is claimed is:

1. An apparatus for providing a safety strategy in a vehicle, the apparatus comprising:
   a sensor configured to obtain information about a driver of the vehicle;
   an output device configured to output a notification to the driver; and
   a control circuit configured to be electrically connected with the sensor and the output device,
   wherein the control circuit is configured to:
      recognize a state of the driver based on the information obtained by the sensor;
      set a route toward a safety zone, when the state of the driver meets a specified condition;
      control the vehicle to change a lane where the vehicle is traveling to a lane adjacent to the safety zone;
      output a transition demand using the output device, when the lane where the vehicle is traveling is changed to the lane adjacent to the safety zone;
      control the vehicle to enter the safety zone, when a control authority is not transitioned to the driver; and
      change the lane where the vehicle is traveling to the lane adjacent to the set safety zone in advance when a validity of the driver is not detected before generating a transition demand (TD).

2. The apparatus of claim 1, wherein the safety zone comprises a rest area, a shelter in a road, or a shoulder.

3. The apparatus of claim 1, wherein the control circuit is configured to:
   change the lane where the vehicle is traveling to the lane adjacent to the safety zone within a specified time interval; and
   output the transition demand using the output device after the specified time interval.

4. The apparatus of claim 1, wherein the control circuit is configured to:
   output the transition demand using the output device, after the lane where the vehicle is traveling is changed to the lane adjacent to the safety zone.

5. The apparatus of claim 1, wherein the control circuit is configured to:
   output the transition demand using the output device after a specified time interval from a time when the state of the driver meets the specified condition.

6. The apparatus of claim 1, wherein the control circuit is configured to:
   search for the route toward the safety zone the vehicle is able to enter within a specified time interval.

7. The apparatus of claim 6, wherein the control circuit is configured to:
   when a plurality of safety zones is found, set a route toward the safety zone closest to the vehicle among the plurality of safety zones.

8. The apparatus of claim 1, wherein the control circuit is configured to:
   provide vehicle control or a notification to guide the driver to change the state of the driver, when the state of the driver meets the specified condition.

9. The apparatus of claim 1, wherein the control circuit is configured to:
   control the vehicle to move to a lane located at a left end or a right end within a road where the vehicle is traveling.

10. The apparatus of claim 1, wherein the safety zone comprises a lane in a specified location among a plurality of lanes included in the road where the vehicle is traveling, and
    wherein the control circuit is configured to:
      control the vehicle to change the lane where the vehicle is traveling to the lane in the specified location.

11. A method for providing a safety strategy in a vehicle, the method comprising:
    recognizing, by a sensor, a state of a driver of the vehicle based on information obtained in the vehicle;
    setting, by a control circuit in electrical connection with the sensor, a route toward a safety zone, when the state of the driver meets a specified condition;
    controlling, by the control circuit, the vehicle to change a lane where the vehicle is traveling to a lane adjacent to the safety zone;
    outputting, by an output device in electrical connection with the control circuit, a transition demand, when the lane where the vehicle is traveling is changed to the lane adjacent to the safety zone;
    controlling, by the control circuit, the vehicle to enter the safety zone, when a control authority is not transitioned to the driver; and
    changing, by the control circuit, the lane where the vehicle is traveling to the lane adjacent to the set safety zone in advance when a validity of the driver is not detected before generating a transition demand (TD).

12. The method of claim 11, wherein the controlling comprises:
    controlling, by the control circuit, the vehicle to change the lane where the vehicle is traveling to the lane adjacent to the safety zone within a specified time interval.

13. The method of claim 12, further comprising:
    outputting, by the output device in electrical connection with the control circuit, the transition demand after the specified time interval.

14. The method of claim 11, further comprising:
    outputting, by the output device in electrical connection with the control circuit, the transition demand, after the lane where the vehicle is traveling is changed to the lane adjacent to the safety zone.

* * * * *